United States Patent
Auber et al.

(10) Patent No.: US 7,110,894 B2
(45) Date of Patent: *Sep. 19, 2006

(54) FILL LEVEL MEASUREMENT DEVICE WITH REMOVABLE AND REPLACEABLE COMPONENTS

(75) Inventors: Herbert Auber, Schramberg (DE); Martin Mellert, Steinach (DE); Martin Mosmann, Wolfach (DE); Thomas Oehler, Gengenbach (DE)

(73) Assignee: Vega Grieshaber KG, Wolfach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/402,905

(22) Filed: Mar. 28, 2003

(65) Prior Publication Data

US 2004/0015304 A1    Jan. 22, 2004

Related U.S. Application Data

(62) Division of application No. 09/659,186, filed on Sep. 12, 2000, now Pat. No. 6,769,300.

(30) Foreign Application Priority Data

Dec. 17, 1999   (DE) ............................... 199 61 156

(51) Int. Cl.
*G01F 23/00* (2006.01)
*G01L 7/00* (2006.01)
*G01N 11/00* (2006.01)

(52) U.S. Cl. ........................................ 702/55

(58) Field of Classification Search .................. 702/50, 702/55, 45, 71, 72, 73, 700, 104, 116, 189
See application file for complete search history.

(56) References Cited

U.S. PATENT DOCUMENTS

| 5,377,128 A | 12/1994 | McBean ................. 364/571.04 |
| 5,675,092 A | 10/1997 | Denis ...................... 73/861.78 |
| 5,751,611 A | 5/1998 | Jamieson ..................... 364/573 |
| 5,947,372 A | 9/1999 | Tiernan ........................ 236/94 |
| 6,769,300 B1 * | 8/2004 | Auber et al. .............. 73/290 R |

FOREIGN PATENT DOCUMENTS

| DE | 3639 455 | | 5/1988 |
| DE | 40 04 939 C2 | | 8/1991 |
| EP | 0 501 900 | | 9/1992 |
| EP | 1 108 991 | * | 6/2001 |
| EP | 1 108 992 | * | 6/2001 |
| FR | 2 640 747 | | 6/1990 |
| FR | 2 739 929 | | 4/1997 |
| JP | 11066341 | | 3/2000 |

* cited by examiner

*Primary Examiner*—Michael Nghiem
(74) *Attorney, Agent, or Firm*—O'Shea, Getz & Kosakowski, P.C.

(57) ABSTRACT

A fill level measurement device includes at least first and second removable and replaceable components that each includes a non-volatile memory device. The device senses that the first removable and replaceable component has been inserted into the fill level measurement device, and provides a sensed signal indicative thereof. In response to the sensed signal, component customer parameter data is received at the first removable and replaceable component, and the received component customer parameter data is written into the non-volatile memory device of the first removable and replaceable component.

11 Claims, 1 Drawing Sheet

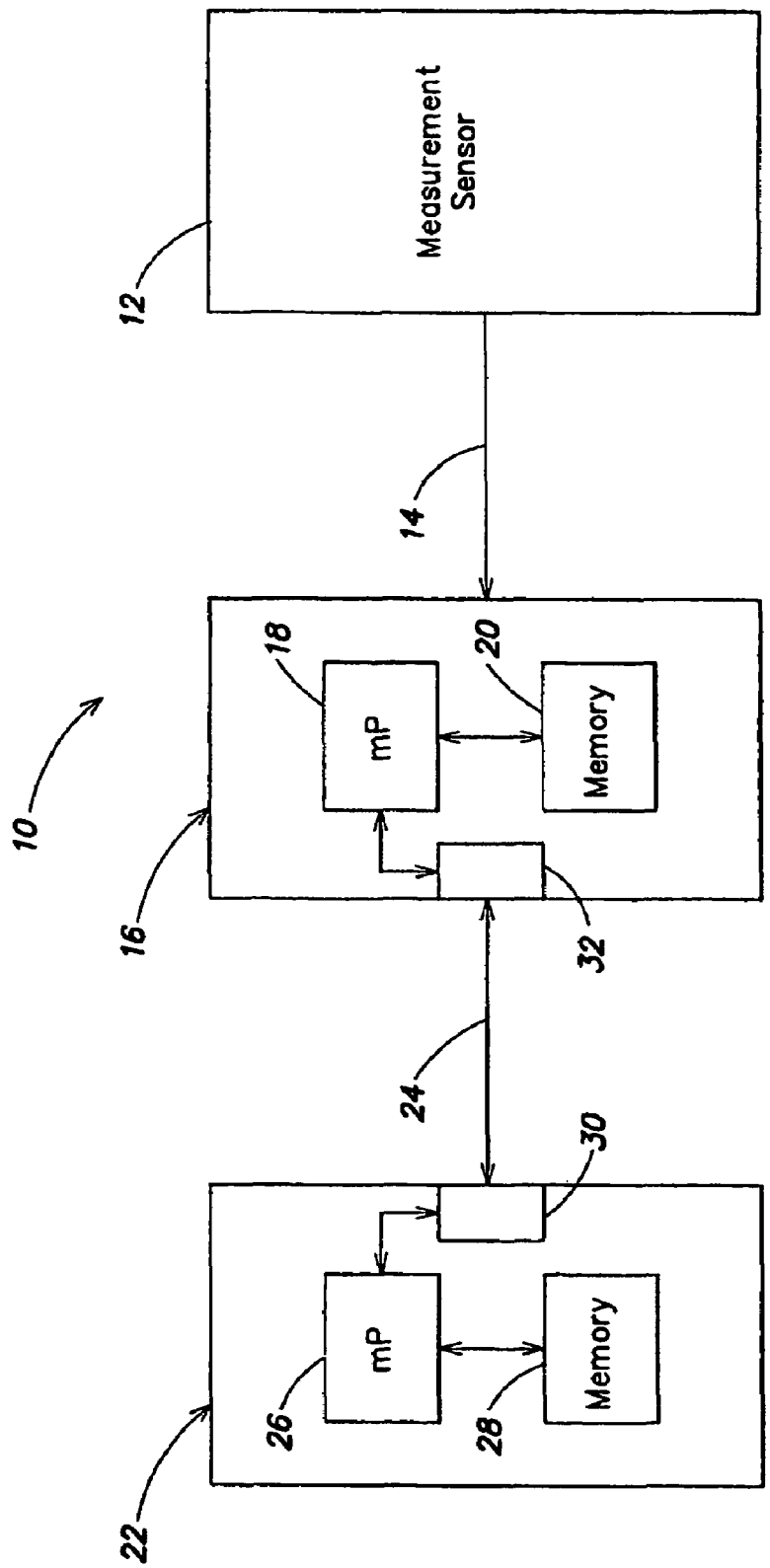
FIGURE

FILL LEVEL MEASUREMENT DEVICE WITH REMOVABLE AND REPLACEABLE COMPONENTS

CROSS REFERENCE TO RELATED APPLICATION

This application is a divisional of application Ser. No. 09/659,186, filed Sep. 12, 2000 now U.S. Pat. No. 6,769,300, entitled "A FILL LEVEL MEASUREMENT DEVICE AND A METHOD FOR OPERATING SUCH A FILL LEVEL MEASUREMENTDEVICE".

BACKGROUND OF THE INVENTION

The present invention relates to the field of fill level sensors, and in particular to fill level sensors that include various removable and replaceable components that include memory containing fill level sensor data.

To measure the fill level of solid bulk goods or liquids in a container, several measurement techniques are known. For example, fill level measurements that employ radar, vibrating rods, pressure, and capacitance measurements are known.

These known sensing techniques often include a measurement sensor that is connected to a converter. This common connection on the converter and measurement sensor is often referred to as the process connection. The supply lines and the electric measurement lines of the measurement sensor are connected to those of the converter.

Voltage flashovers can occur at the measurement sensor, which destroy parts of the measurement sensor or the electronic analytical device. For applications in hazardous areas, precautions are prescribed, such as for example minimum distances between the electric lines, to assure reliable protection against explosions.

The data generated by the measurement sensor are conducted to a measurement data converter, which for example converts them into digital data, and transmits the digital data to an electronic analytical device. Before the fill level measurement device is started, customer-specific parameter data must be entered into the fill level measurement device. When the measurement data converter or the electronic analytical device are replaced, these customer-specific parameter data must be re-entered into the fill level measurement device, which results in undesirable complication.

Therefore, there is a need for a fill level measurement device that automatically updates customer specific parameter data when a component of the measurement device is replaced.

SUMMARY OF THE INVENTION

Briefly, according to an aspect of the invention, a fill level measurement device includes at least first and second removable and replaceable components that each include a non-volatile memory device. The device senses that the first removable and replaceable component has been inserted into the fill level measurement device, and provides a sensed signal indicative thereof. In response to the sensed signal, component customer parameter data is received at the first removable and replaceable component, and the received component customer parameter data is written into the non-volatile memory device of the first removable and replaceable component.

The measurement data converter includes a first non-volatile memory, and the electronic analytical device contains a second non-volatile memory, and that the same parameter data are redundantly stored in both memories.

The inventive fill level measuring device includes a measurement sensor, a measurement data converter, and an electronic analytical device. The measurement sensor is situated at the measurement point and measures the fill level, for example in a container or a tank. The measurement sensor is connected to the measurement data converter through a line. The measurement data converter generally is situated near the measurement sensor. The measurement data converter is connected to an electronic analytical device through another line. The measurement sensor transmits its measured data to the measurement data converter, which converts them into digital data, and transmits them to the electronic analytical device.

The measurement data converter contains a first non-volatile memory and the electronic analytical device contains a second non-volatile memory. The same parameter data, which are absolutely necessary to operate the fill level measurement device, are redundantly stored in both of these memories.

If the measurement data converter is replaced because of a defect or for maintenance purposes, the parameter data, which are redundantly stored in the memory of the electronic analytical device, are automatically read into the memory of the new measurement data converter as soon as this has been installed. Similarly, when the electronic analytical device is replaced (e.g., because of a defect or for maintenance purposes), the parameter data redundantly stored in the memory of the measurement data converter are automatically read into the memory of the newly installed analytical device. Whether the measurement data converter or the electronic analytical device is replaced, the previously redundantly stored parameter data are again available in both memories as soon as the new device has been installed.

Because the parameter data that are necessary for starting and operating the inventive fill level measurement device are stored redundantly both in the measurement data converter and in the electronic analytical device, they no longer need to be entered anew when one of these two devices is replaced.

These and other objects, features and advantages of the present invention will become more apparent in light of the following detailed description of preferred embodiments thereof, as illustrated in the accompanying drawings.

BRIEF DESCRIPTION OF THE DRAWINGS

The FIGURE is a block diagram illustration of a fill level measurement device.

DETAILED DESCRIPTION OF THE INVENTION

The FIGURE is a block diagram illustration of a fill level measurement device 10. The device 10 includes a measurement sensor 12 that senses the fill level within a container or tank (not shown), and provides a measurement signal on a line 14 to a measurement data converter 16. The measurement data converter 16 includes a microprocessor 18 and a non-volatile memory 20. The measurement data converter 16 is connected to an electronic analytical device 22 via line 24. The electronic analytical device 22 includes a microprocessor 26 and a non-volatile memory 28. The microprocessor 18 is connected to the non-volatile memory 20, while the microprocessor 26 is connected to the non-volatile memory 28. The two microprocessors 18, 26 are connected to one another via the communication link on the line 24.

When fill level measurement device 10 is installed and first operated, the customer-specific parameter data are entered at least into one of the two non-volatile memories 20, 28. The customer-specific parameter data is then automatically read into the other non-volatile memory. However, they can also be read simultaneously into both non-volatile memories.

When the measurement data converter 16 is replaced, the data stored in the non-volatile memory 28 of the electronic analytical device are automatically read, via the line 24, into the non-volatile memory 20 of the newly installed measurement data converter 16. Analogously, when the electronic analytical device 22 is replaced, the data stored in the non-volatile memory 20 of the measurement data converter 16 are automatically read, via the line 24, into the non-volatile memory 28 of the newly installed electronic analytical device 22.

Data transmission between the measurement data converter 16 and the electronic analytical device 22 can be for example asynchronous serial.

It is especially advantageous for the measurement data converter 16 and the electronic analytical device 22 to be electrically isolated. An especially suitable transmission medium between the measurement data converter 16 and the electronic analytical device 22 is for example an optical fiber or an electric conductor, with optocouplers 30, 32 at each end. Besides the data transmission, the transmission of the supply voltage is also electrically decoupled. The electrical isolation achieves a number of advantages.

For example, the supply lines are better protected against flashovers to ground, since no voltage flashover from the process connection to the measurement sensor can occur, because the electronics of the measurement sensor 12 are directly connected to ground.

Ceramic capacitive measurement sensors are used preferably for measuring the fill level, because they are distinguished by a number of advantages. However, ceramic capacitive measurement sensors have parasitic stray capacitances, between the housing and both the measurement capacitance and the reference capacitance. Due to the unavoidable coupling of interference on the lines, especially in the low frequency range, this stray capacitance can cause a relative measurement error up to 50%. The electrical isolation advantageously eliminates this measurement error completely.

In hazardous areas, minimum distances are prescribed between the process connection and the supply lines, which carry supply currents between 4 and 20 mA. However, due to the electrical isolation, the measurement sensor 12 can very simply be built into a metallic process connection. A measurement sensor with a membrane electrode can be built in especially easily, because, due to the electrical decoupling, the membrane electrode can be electrically connected to the metallic process connection. No additional measures need to be taken any longer for protecting against explosion, such as for example safety distances between the process connection and the measurement data converter.

Finally, due to the electrical isolation, the measurement result is no longer garbled by the mutual coupling between the measurement data converter and the electronic analytical device. The electrical isolation thus substantially improves the signal-to-noise ratio.

As already mentioned, the electrical isolation can be realized by an optical fiber and two optocouplers 30, 32, or for example by a transformer.

A first essential advantage of the invention is that the measurement data converter 16 and the electronic analytical device 22 can be replaced while the system is running. A second essential advantage is that, after replacement of the part, no new adjustment is required, because the required data are stored redundantly and are automatically read into the empty memory of the newly installed part. The invention thus substantially reduces the expenditure of time and thus also the costs for maintenance and repair.

Although the present invention has been shown and described with respect to several preferred embodiments thereof, various changes, omissions and additions to the form and detail thereof, may be made therein, without departing from the spirit and scope of the invention.

What is claimed is:

1. A fill level measurement device, in which a measurement sensor is connected to a measurement data converter, which is connected to an electronic analytical device, characterized in that the measurement data converter contains a first non-volatile memory, and the electronic analytical device contains a second non-volatile memory, and that the same calibration data are redundantly stored in both said first and second non-volatile memories, wherein when the measurement data converter is replaced, the data stored in the second non-volatile memory of the electronic analytical device are transmitted to the first non-volatile memory of the newly installed measurement data converter.

2. The fill level measurement device of claim 1, characterized in that, when the electronic analytical device is replaced, the data stored in the first non-volatile memory of the measurement data converter are transmitted to the second non-volatile memory of the newly installed electronic analytical device.

3. The fill level measurement device of claim 1, characterized in that the measurement data converter and the electronic analytical device are electrically isolated.

4. The fill level measurement device of claim 3, characterized in that the measurement data converter is connected to the electronic analytical device by an optical fiber, with an optocoupler at each end.

5. The fill level measurement device of claim 3, characterized in that the measurement data converter is connected to the electronic analytical device through a transformer.

6. A fill level measurement device, comprising:
a fill level measurement sensor that provides a sensed fill level signal indicative of the level within a container;
a first removable and replaceable component that includes a first non-volatile memory device and receives said sensed fill level signal, and which senses being inserted into said fill level measurement device and provides a sensed signal indicative thereof;
a second removable and replaceable component that includes a second non-volatile memory device containing component customer parameter data, and which transmits said component customer parameter data to said first removable and replaceable component in response to said sensed signal; and
wherein said first removable and replaceable component receives said component customer parameter data from said second removable and replaceable component and writes said received component customer parameter data into said first non-volatile memory device.

7. The fluid level measurement device of claim 6, comprising an asynchronous serial data link between said first and second removable and replaceable components.

8. The fluid level measurement device of claim 6, comprising a serial data link between said first and second removable and replaceable components.

9. A fill level measurement device that senses the fill level of an object within a container, comprising:
 a fill level measurement sensor that provides a sensed fill level signal indicative of the level within the container;
 a signal processing device that is responsive to said sensed fill level signal and includes
 a first removable and replaceable component that includes a first non-volatile memory device,
 a second removable and replaceable component that includes a second non-volatile memory device containing component customer parameter data; and
 means for sensing the insertion of said first removable and replaceable component into said fill level measurement device and provides a sensed signal indicative thereof;
 wherein, in response to said sensed signal, said second removable and replaceable component transmits said component customer parameter data to said first removable and replaceable component, and said first removable and replaceable component stores said received component customer parameter date and into said first non-volatile memory device.

10. The fluid level measurement device of claim 9, comprising an asynchronous serial data link between said first and second removable and replaceable components.

11. The fluid level measurement device of claim 9, comprising a serial data link between said first and second removable and replaceable components.

\* \* \* \* \*